Sept. 15, 1936.   P. A. NELSON   2,054,335
MACHINE FOR MANUFACTURING FISHHOOKS
Filed July 16, 1935   6 Sheets-Sheet 3

INVENTOR.
PAUL A. NELSON
BY
ATTORNEY.

Sept. 15, 1936.  P. A. NELSON  2,054,335
MACHINE FOR MANUFACTURING FISHHOOKS
Filed July 16, 1935  6 Sheets-Sheet 5

INVENTOR.
PAUL A. NELSON
BY
ATTORNEY.

Sept. 15, 1936.  P. A. NELSON  2,054,335
MACHINE FOR MANUFACTURING FISHHOOKS
Filed July 16, 1935  6 Sheets-Sheet 6

INVENTOR.
PAUL A. NELSON
BY
ATTORNEY

Patented Sept. 15, 1936

2,054,335

UNITED STATES PATENT OFFICE 2,054,335

MACHINE FOR MANUFACTURING FISHHOOKS

Paul A. Nelson, Golden, Colo., assignor to Wright & McGill Co., Denver, Colo., a corporation of Colorado Application July 16, 1935, Serial No. 31,559

17 Claims. (Cl. 29—9)

This invention relates to an automatic machine for manufacturing fish hooks and has for its principal object the provision of a machine of this character which will be entirely automatic in its operation, and which will automatically and continuously convert metallic wire into completely finished fish hooks.

Another object of the invention is to provide an automatic machine which can be readily adjusted to form fish hooks of various types and sizes without requiring major adjustments in the machine itself.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 7 is a detail section, taken on the line 7—7, Fig. 5.

Fig. 8 is an enlarged plan view of the forming portion illustrating the former in the open position.

The invention comprises a suitable work table 10 which may be supported upon any suitable supporting frame or other structure (not shown). A steel wire 11 feeds into the table 10 from a reel or other supply.

The wire 11 is first received from a first series of vertically positioned straightening rolls 12, and thence passes through a second similar series of horizontal straightening rolls 13. The pressure of the rolls on the wire can be minutely and accurately adjusted by means of a series of pressure screws 14. These rolls serve to remove any kinks or bends from the incoming wire and to deliver it in a perfectly straight condition to the machine. The straightening rolls 12 and 13 are supported from brackets 17 and 18 respectively, which are in turn secured to a sliding crosshead 16.

A ratchet wire clamp 15 is also mounted on the crosshead 16 so that it moves with the straightening rolls to engage the wire when moving forward and release the wire when moving rearward. The cross head reciprocates in a track 117 on the table 10. The reciprocation is imparted by means of a stud 19 which extends downwardly through a slot 20 in the table 10.

A gripper is provided to grip the wire 11 during a part of the return movement of the clamp 18 so as to prevent the withdrawing of the wire as the straightening rolls travel rearwardly thereon. This gripper consists of a fixed lower jaw 22 with which a gripping lever 21 cooperates to grip the wire. The gripping lever terminates in a cam roller 28. The gripping lever is operated from a sliding cam 23 projecting upwardly from a longitudinally movable cam bar 24.

It is necessary during the operation of the machine to withdraw the wire 11 a predetermined distance after it has been moved inwardly by the clamp 15. This is accomplished by mounting the gripper 21 on a second cross head 85 which slides in the track 117 ahead of the cross head 16. The second cross head 85 is constantly pulled toward the feed extremity by means of a pair of tension springs 26. The springs 26 are enclosed in spring tubes 25. A stop bar 29 limits the action of the springs 26 and the return movement of the gripper.

Figure 1:
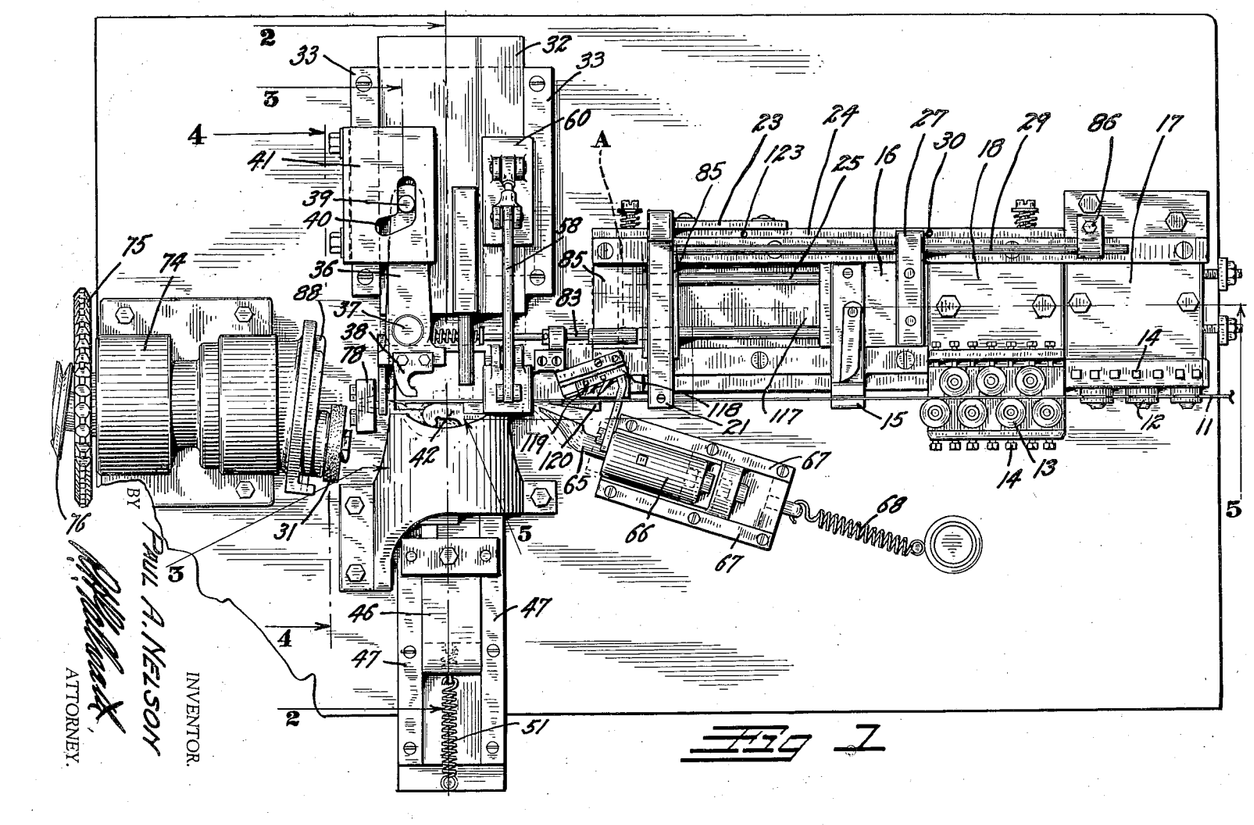
Fig. 1 is a plan view of the work table of the improved fish hook machine.
Figures 2, 3, 4:
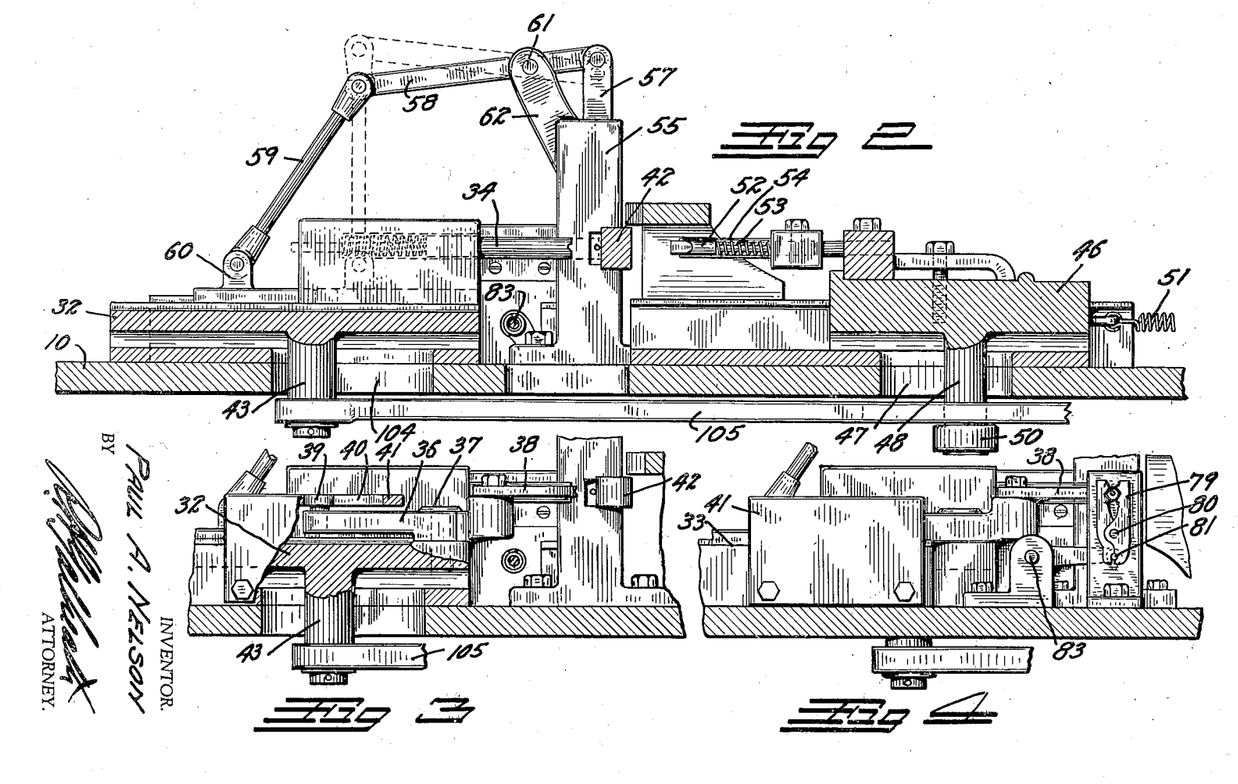
Fig. 2 is a cross section through the machine, taken on the line 2—2, Fig. 1.
Fig. 3 is a fragmentary section, taken on the line 3—3, Fig. 1.
Fig. 4 is a similar section taken on the line 4—4, Fig. 1.
Figures 4, 5, 6:
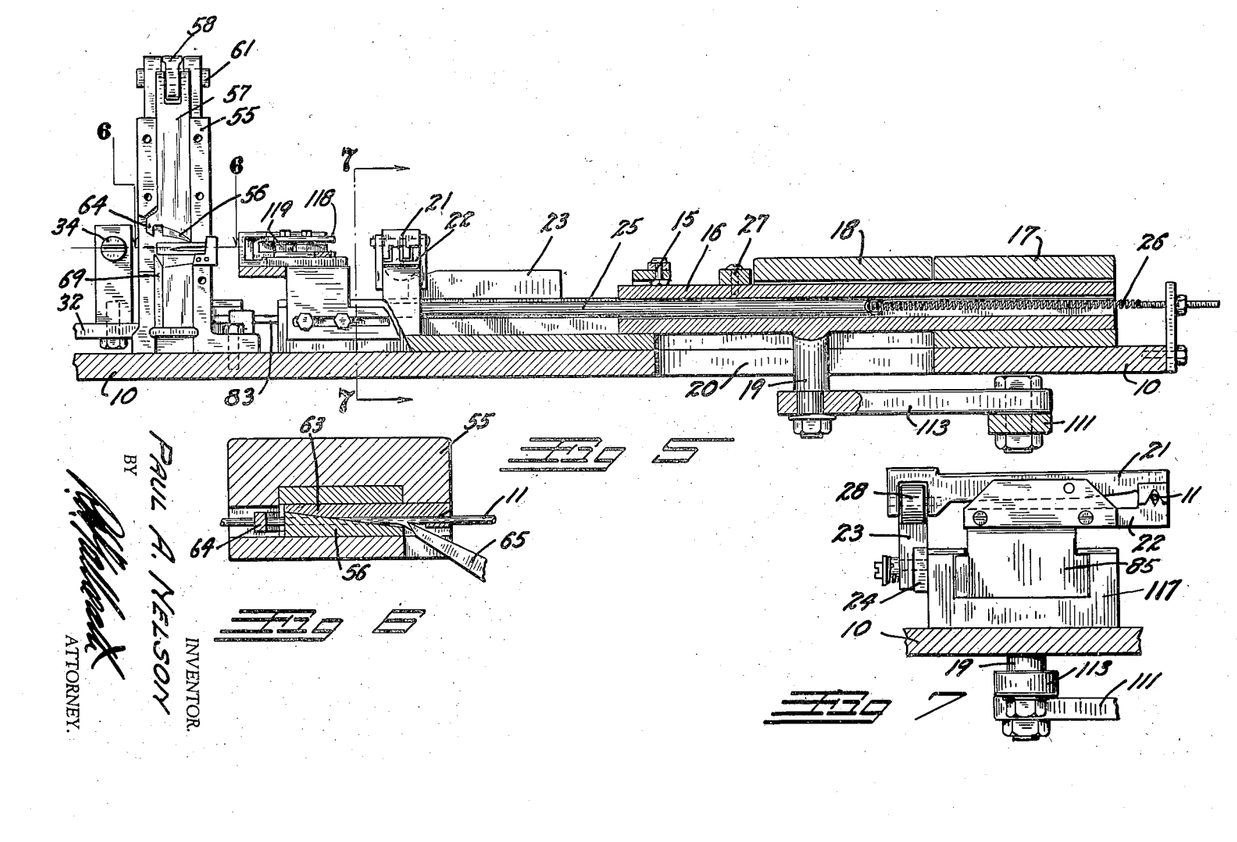
Fig. 5 is a longitudinal section taken on the line 5—5, Fig. 1.
Fig. 6 is a detail horizontal section through the cutting die, taken on the line 6—6, Fig. 5, illustrating the barb forming knife in the forming position.

The operation of the feed mechanism is as follows: the cross head 16, with the straightening rolls, starts inwardly with the clamp 15 gripping the wire 11, and pushes the wire into the machine. As the cross head approaches the limit of its movement, it contacts with the second cross head 85 and carries the latter forward with it. An arm 27, mounted thereon strikes a gauge pin 123 on the cam bar 24 and moves the latter inward to position the cam 23 at the proper position to receive the cam roller 28 of the gripper on the return stroke. The forward motion stops when the second cross head reaches the broken line position "A", Fig. 1, which is the extreme insertion point for the wire. The cross heads then return and partially withdraw the wire until the cam roller of the gripper rides upon the cam 23 to close the gripper on the wire. The second cross head then contacts the stop bar 29 and ceases to follow the first cross head. This prevents further withdrawal of the wire and the first cross head pulls the straightening rolls rearward thereover to straighten the next section thereon. The distance the wire is withdrawn can be accurately preset by adjusting the stop bar 29 in the clamp 86, and it is this distance which determines the length of the shank on the completed hook.

As the returning first cross head approaches its extreme outward position, the arm 27 will strike a return pin 30 on the slide bar 24 so as to move the latter outwardly to withdraw the cam 23 from beneath the roller 28 and allow the gripping lever 21 to open for another forward movement of the wire.

The extreme inward movement of the wire positions the inner extremity thereof opposite an angularly placed, eccentrically positioned, grinding wheel 31 which is both rotating and gyrating so as to grind an accurate point upon the wire. When the gripper moves outward to the stop bar 29, it withdraws the wire from the grinding wheel and positions it opposite the forming mechanism of the machine.

The forming mechanism consists of a laterally positioned slide block 32 mounted between suitable guides 33 on the table 10. The slide block 32 is reciprocated from a downwardly extending stud 43 which extends through a slot 104 in the table 10. The slide block carries a spring actuated clamp bar 34 which is urged forwardly from the block by a compression spring 35. The extremity of the clamp bar 34 is grooved and serves as a clamping member to clamp the wire against a clamp block 87. The slide block also carries a forming lever 36 pivoted thereon at 37. One extremity of the forming lever terminates in a hook-shaped former 38. The other extremity terminates in a cam pin 39 which rides in an angular cam slot 40 in a cam plate 41 secured on one of the guides 33.

Figure 9:
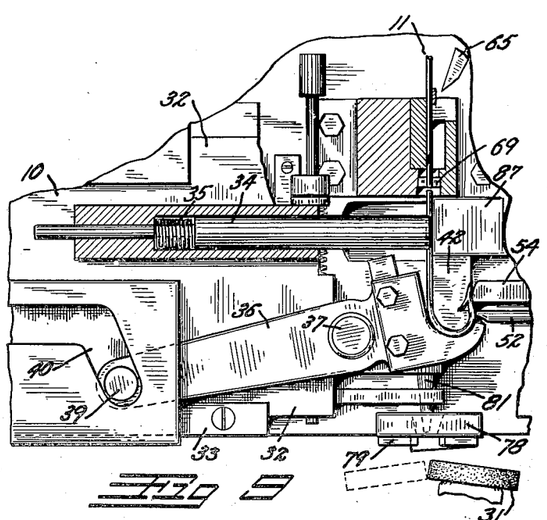
Fig. 9 is a similar view illustrating the former in the closed position.
Figure 10:
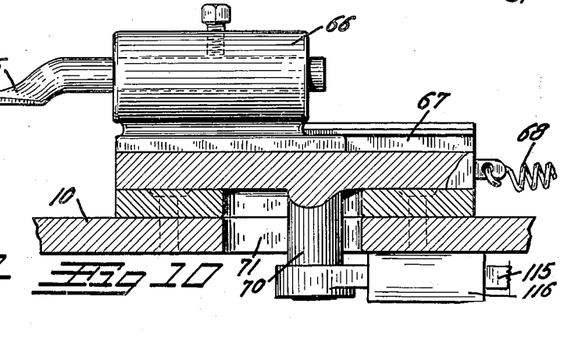
Fig. 10 is a detail longitudinal section through the barb forming slide.

The former 38 cooperates with a hook-shaped forming die 42 which is fixedly secured to the table 11. As the slide block 32 moves inwardly toward the wire 11, the push rod 34 will first engage the wire and clamp it tightly against the clamp block 87, as shown in Fig. 8. The former 38 will then move against projecting extremity of the wire and bend it around the die 42 to a substantially 90° bend, as shown in Fig. 9. At the completion of the 90° bend, the cam pin 39 will enter the angle turn of the cam slot 40 so as to swing the rearward extremity of the forming lever 36 to cause the hook shaped former to move inward around the hook shaped extremity on the die 42 to give the U shaped bend to the fish hook.

Figures 11, 12, 13:
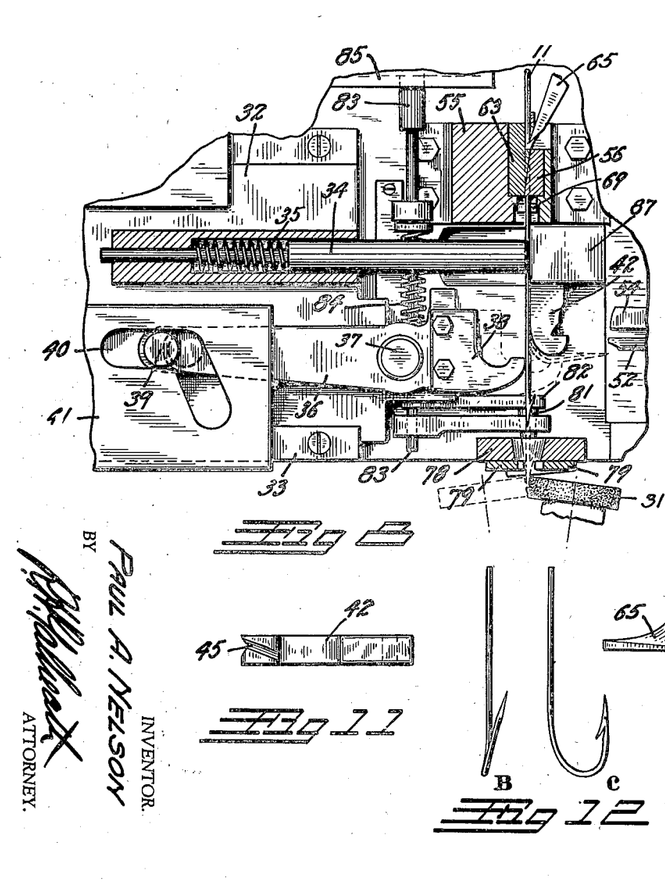
Fig. 11 is a detail edge view of the former looking in the direction of the arrow "D", Fig. 8.
Fig. 12 illustrates a front and side view of a completed hook formed on the machine.
Fig. 13 is an enlarged horizontal section through the grinding wheel trunnion.
Figure 13:
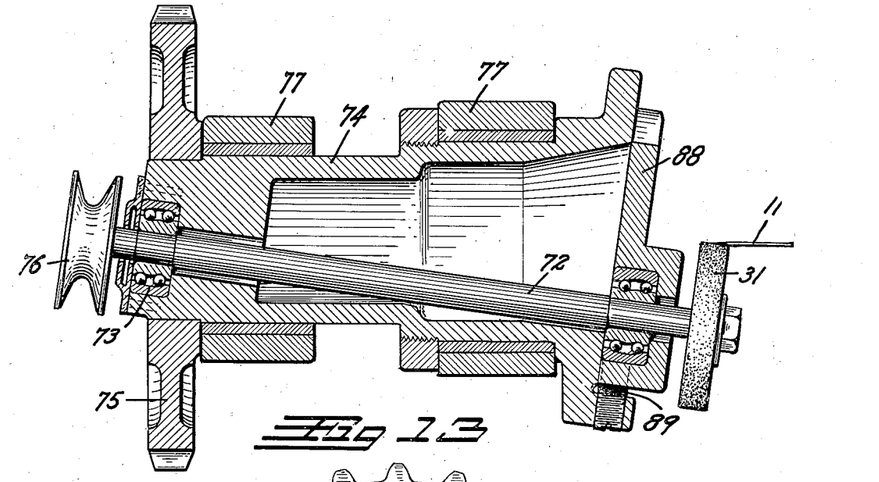
Figure 14:
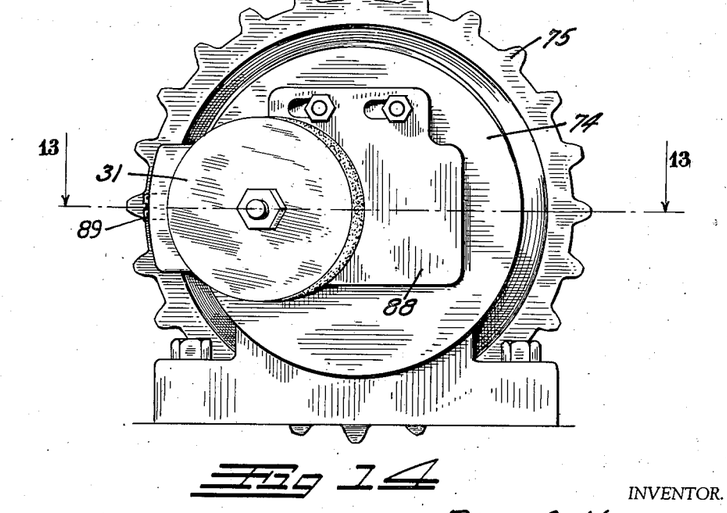
Fig. 14 is a front view of the grinding wheel trunnion.
Figure 15:
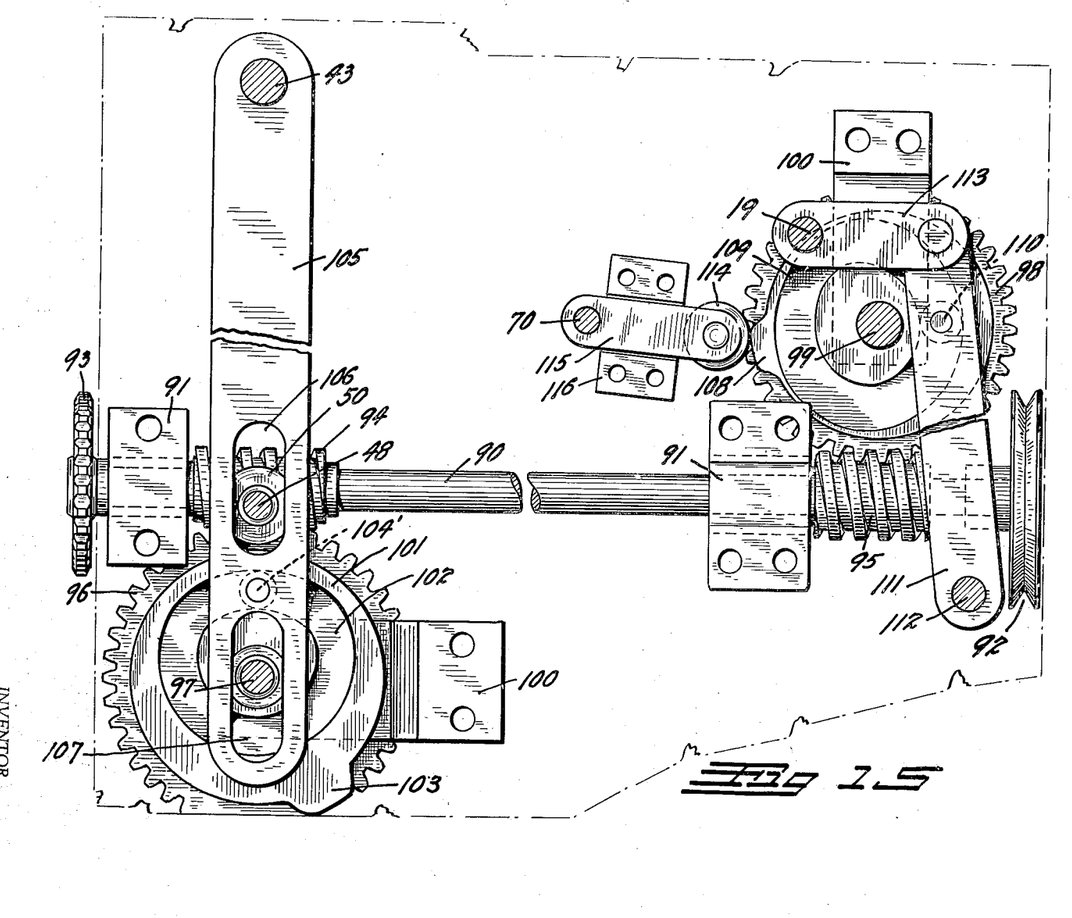
Fig. 15 is a plan view of the drive mechanism which is located below the table top. This view is taken looking downwardly thereon as though the table top were removed.

It is often desirable that the hook have a slight lateral bend or offset as shown at "B" in Fig. 12. This is accomplished by forming a lead groove 45 in the hooked extremity of the former 38. This receiving groove is inclined and is followed by the wire as it swings around the die to give it the desired offset bend. The extremity of the former is notched as shown at 45' to receive and prevent the wire from slipping therefrom.

It is desirable that the pointed extremity of the hook be bent outwardly after it has completed its hook-shape bend to properly shape and point the barb. This is accomplished by a final forming mechanism which is mounted on a second slide block 46 operated between guides 47 on the opposite side of the wire 11. The second former is actuated from a stud 48 extending downwardly through a slot 49 in the table 10 and terminating in a cam roller 50. The stud moves the block 46 inwardly toward the wire 11 and a tension spring 51 draws it outwardly.

The second slide block 46 carries a clamping bar 52, cushioned by a spring 53, and a forming head 54 rigidly projecting therefrom. After the wire has been given the U-shaped bend around the die 42, the slide block 46 moves inwardly to cause the clamping bar 52 to force the barbed extremity into a shaping depression 88 in the die 42. While the hook is held in this position the slide block 46 moves still farther inwardly until the forming head 54 contacts the hook opposite the barb thereof to give the final shaping to that pointed extremity thereof, as shown in Fig. 9.

A vertical post 55 projects from the table 10 to carry the cutting-off mechanism. This mechanism consists of a vertically acting angle face cutting die 56 reciprocated through a connecting link 57 from a rocking lever 58. The rocking lever is operated from a connecting rod 59 extending to a hinge bracket 60 on the slide block 32. The lever 58 is pivoted on a pin 61 in a bracket arm 62 extending from the post 55.

The cutting die 56 cooperates with a stationary shear block 63, the two cooperating faces being set at an acute angle across the wire so that the wire is sheared to produce a relatively sharp point on the incoming extremity. The rear extremities, however, of the preceding portion is cut off square by a cross knife 64 carried by the shearing die 56 so as to produce a flat rear end on the hook section.

The barb is formed on the hook by means of a sharp barb knife 65 which adjustably projects from a barb slide 66 mounted between guides 67 on the table 10 at an acute angle to the wire 11. The barb slide 66 is constantly pulled rearwardly by means of a tension spring 68 and is moved forwardly by a stud 70 projecting through a slot 71 in the table top 11. At the time that the shearing die 56 is closed, the barbing knife 65 moves forward to cut or slice a pointed portion or barb from the side of the wire as shown in Fig. 8. As the shearing die opens, the barbing knife moves away to allow the sharpened barbed point to pass to the grinding wheel 31.

The grinding wheel 31 is carried on an angle shaft 72 mounted in self-aligning ball bearings 73 in a hollow rotating trunnion 74. The trunnion 74 is rotated in suitable bearings 77 from a sprocket wheel 75 and the shaft 72 is rotated from a pulley 76. The ball bearing adjacent the grinding wheel 31 is carried in a bearing plate 88 which can be laterally shifted by means of a set screw 89 to properly position the grinding wheel with reference to the wire 11. It can be seen that with the shaft 72 rotating in relatively high speed and the trunnion 74 rotating in relatively low speed, the grinding wheel 31 will be swung around the point of the wire on a conical angle so as to grind and sharpen a conical point thereon.

It is essential that the wire be held rigid during the grinding operation. This is accomplished by passing the wire through a guide block 78 upon which a pair of plier-like clamping jaws 79 are mounted upon a pivot pin 80. The clamping jaws 79 are forced shut at their outer extremities so as to firmly clamp the wire therebetween during the grinding operation by means of a wedge-shaped pin 81 extending from the extremity of a bracket arm 82 which in turn is secured on a push rod 83. The push rod 83 extends rearwardly to a point in the path of the second cross head 85. A compression spring 84 constantly holds the wedge pin 81 in the withdrawn position until the push rod 83 is forced forward by contact with the cross head 85. This contact is always made at the final movement of the gripper 21 so that the wire 11 is always clamped at the limit of its extreme inward movement. As soon as the gripper retracts to withdraw the wire it releases the push rod 83 and allows the clamps 79 to open and release the wire.

The entire machine is driven from a drive shaft 90 extending longitudinally beneath the table 10 in suitable bearing blocks 91. This shaft is provided with a drive pulley 92 at its one extremity and with a chain sprocket 93, for driving the grinding trunnion 74, at its other. The drive shaft is also provided with two worms 94 and 95, the first of which, 94, drives a worm gear 96 on the cam shaft 97. The second, 95, drives a worm gear 98 on a cam shaft 99. These shafts are journalled in the bottom of the table 10 and in suitable bearing brackets 100 mounted thereunder.

The first shaft 97 carries a cam 101 provided with a face cam track 102 and an edge cam 103. A follower roll 104' travels in the face cam track 102. This roll is secured on a reciprocating bar 105 which connects at its extremity with the stud 43 of the slide block 32 which reciprocates therefor in consequence of the contour of the cam track 102. A slot 107 is provided in the bar 105 to allow it to move relative to the cam shaft 97.

The stud 48 from the second slide block 46 projects through a slot 106 in the bar 105 and the roller 50 thereon is held against the cam 103 by the spring 51. The second slide block 46 moves, therefore, in consequence of the contour of the cam 103.

The second cam shaft 99 carries a cam 108 having a face track 109. A follower roll 110 follows the face track 109. The roll 110 is secured on a lever 111 pivoted at one extremity beneath the table at 112. The other extremity of the lever 111 is hinged to a link 113 which in turn connects with the stud 19 of the first cross head 16. The latter therefore, reciprocates in consequence of the contour of the cam track 109.

A cam roller 114 follows the contour of the cam 108. This roller is carried in a slide bar 115 in a slide 116 on the bottom of the table 10. The slide bar 115 connects directly with the stud 70 of the barbing slide 66. The latter, therefore, reciprocates in consequence of the contour of the cam 108.

In operation the wire feeds into the machine in a continuous series of intermittent movements. First a long inward stroke which brings the extremity to the grinding wheel where it pauses. Thence a short rearward movement to the forming and cutting off position at which time the barb is formed in the next succeeding hook. The rearward movement determines the length of the wire in the hook. This can be accurately preset by adjustment of the stop bar 29 and an adjusting clamp 29 mounted on the straightening roll block 17.

On certain types of hooks small barbs are formed on the hook shank for holding the bait in place thereon. Such hooks can be manufactured in this machine by the addition of an attachment thereto. Such an attachment is shown applied to the machine in Fig. 1 only. It consists of a knife block 118 carried in an angularly positioned slide member 121 alongside of the path of the wire 11 and carrying one or more secondary barbing knives 119. On the opposite side of the wire a stationary anvil block 120 is supported by the slide member 121. An arm 122 connects the knife block 118 with the barb slide 22. As the barb slide 66 moves forwardly to cut the main hook barb, it forces the knife block 118 forwardly and the angularly positioned slide member 121 forces it toward the wire until the sharp edges of the barbing knives 119 clamp the wire against the anvil block to cut the bait barbs in the hook shank. The grinding wheel pulley 76 is driven from a flexible V-belt so that it is free to wobble as the bearing sleeve 74 rotates.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:—

1. A machine for manufacturing fish hooks from a continuous wire comprising: a forming die positioned at the side of said wire; a former moving laterally of the line of travel of said wire and shaped to bend the latter about said die; cutting means for cutting said wire into sections; and means for intermittently feeding said wire to said forming die and said cutting means.

2. A machine for manufacturing fish hooks from a continuous wire comprising: a forming die positioned at the side of said wire; a former moving laterally of the line of travel of said wire and shaped to bend the latter about said die; cutting means for cutting said wire into sections; a reciprocating member adjacent said wire; and a gripper secured to said reciprocating member for gripping said wire at predetermined positions of said reciprocating member so as to feed said wire to said forming die.

3. A machine for manufacturing fish hooks from a continuous wire comprising: a forming die positioned at the side of said wire; a former moving laterally of the line of travel of said wire and shaped to bend the latter about said die; a reciprocating member adjacent said wire; a ratchet-like clamp projecting from said reciprocating member to grip said wire and feed it to said forming die as said reciprocating member moves in one direction and release said wire when said member moves in the other direction.

4. A machine for manufacturing fish hooks from a continuous wire comprising: a forming die positioned at the side of said wire; a former moving laterally of the line of travel of said wire and shaped to bend the latter about said die; a reciprocating member adjacent said wire; a ratchet-like clamp projecting from said reciprocating member to grip said wire and feed it to said forming die as said reciprocating member moves in one direction and release said wire when said member moves in the other direction; and means for gripping and holding said wire as said member moves in the latter direction.

5. A machine for manufacturing fish hooks from a continuous wire comprising: a grinder for sharpening the extremity of said wire; a former for bending said wire to the desired hook-shape; a shear for cutting said wire; feeding means for feeding the extremity of said wire to said grinder; withdrawing means for returning said wire to said former after grinding; and means for actuating said former and said shear against said wire after it has been returned by said returning means.

6. A machine for manufacturing fish hooks from a continuous wire; comprising a grinder for sharpening the extremity of said wire; a former for bending said wire to the desired hook-shape; a shear for cutting said wire; a reciprocating member adjacent said wire; a ratchet clamp actuated by said reciprocating member for feeding said wire to said grinder; and a gripper actuated by said reciprocating member for gripping and returning said wire to said former and said shear.

7. In a machine for manufacturing fish-hooks from a continuous wire, means for forming the required hook-shaped bend in said wire comprising: a hook-shaped die on one side of said wire; a hook-shaped former normally positioned on the other side of said wire; means for imparting a first lateral movement to said former to bend said wire substantially 90° around the extremity of said die; and means for imparting an arcuate movement to said former to bend said wire substantially an additional 90° about the extremity of said die.

8. In a machine for manufacturing fish-hooks from a continuous wire, means for forming the required hook-shaped bend in said wire comprising: a hook-shaped die on one side of said wire; a hook-shaped former normally positioned on the other side of said wire; means for imparting a lateral movement to said former so as to cause the latter to bend said wire around said die; and means for clamping said wire against said die in advance of the action of said former.

9. In a machine for manufacturing fish-hooks from a continuous wire, means for forming the required hook-shaped bend in said wire comprising: a hook-shaped die on one side of said wire; a hook-shaped former normally positioned on the other side of said wire; means for imparting a first lateral movement to said former to bend said wire substantially 90° around the extremity of said die; means for imparting an arcuate movement to said fromer to bend said wire substantially an additional 90° about the extremity of said die; and means for finally forming the point of the bent wire.

10. In a machine for manufacturing fish-hooks from a continuous wire, means for forming the required hook-shaped bend in said wire comprising: a hook-shaped die on one side of said wire; a hook-shaped former normally positioned on the other side of said wire; means for imparting a first lateral movement to said former to bend said wire substantially 90° around the extremity of said die; means for imparting an arcuate movement to said former to bend said wire substantially an additional 90° about the extremity of said die; a second former moving in a direction opposite to said first former; and means for forcing said second former against the extremity of said wire at the completion of the second 90° bend.

11. In a machine for manufacturing fishhooks from a continuous wire, a grinder comprising: a rotatably mounted trunnion; a grinding wheel shaft extending through said trunnion at an actue angle to the axis of the latter so that one extremity of said shaft will be eccentric of the axis of said trunnion, and the other extremity substantially concentric therewith; a grinding wheel mounted on the eccentric extremity; means for rotating said grinding wheel shaft at a relatively high speed; means for rotating said trunnion at a relatively slow speed so that said grinding wheel will describe an orbit about the axis of said trunnion; and means for feeding the extremity of said wire to said wheel on the axis of said trunnion.

12. In a machine for manufacturing fish hooks from a continuous wire, a grinder comprising; a rotatably mounted trunnion; a grinding wheel shaft extending through said trunnion at an acute angle to the axis of the latter so that one extremity of said shaft will be eccentric of the axis of said trunnion, and the other extremity substantially concentric therewith; a grinding wheel mounted on the eccentric extremity; means for rotating said grinding wheel shaft at a relatively high speed; means for rotating said trunnion at a relatively slow speed so that said grinding wheel will describe an orbit about the axis of said trunnion; means for feeding the extremity of said wire to said wheel on the axis of said trunnion; and means for regulating the degree of eccentricity of said grinding wheel shaft as desired.

13. In a machine for manufacturing fish hooks from a continuous wire, a grinder comprising: a rotatably mounted trunnion at an acute angle to the axis of the latter so that one extremity of said shaft will be eccentric of the axis of said trunnion, and the other extremity substantially concentric therewith; a grinding wheel mounted on the eccentric extremity; means for rotating said grinding wheel shaft at a relatively high speed; means for rotating said trunnion at a relatively slow speed so that said grinding wheel will describe an orbit about the axis of said trunnion; and means for feeding the extremity of said wire to said wheel on the axis of said trunnion; a clamping member for clamping said wire in position against said grinding wheel; and means for actuating said clamping member when said wire reaches said wheel.

14. In a machine for manufacturing fish hooks from a continuous wire, means for cutting said wire into sections of a predetermined length and forming a point thereon comprising: a shear block in the path of said wire, said block having an acute cutting edge positioned at an angle across the incoming wire and a second 90° cutting edge positioned across the end of the cut section; and a cutting die having similarly positioned cutting edges for cooperating with said block to cut a pointed angle cut on the incoming extremity and a square cut on the outgoing extremity.

15. In a machine for manufacturing fish hooks from a continuous wire; means for cutting said wire into sections of a predetermined length and forming a point and a barb thereon comprising: a shear block in the path of said wire, said block having an acute cutting edge positioned at an angle across the incoming wire and a second 90° cutting edge positioned across the end of the cut section; and a cutting die having similarly positioned cutting edges for co-operating with said block to cut a pointed angle cut on the incoming extremity and a square cut on the outgoing extremity; an angularly positioned barbing knife; and means for forcing said barbing knife against one side of the incoming extremity of said wire while said cutting die is closed thereon.

16. A machine for manufacturing fish hooks from a continuous wire comprising: means for intermittently feeding said wire to said machine; a cutting die for forming a pointed extremity on said wire; a gyrating grinding wheel for grinding said pointed extremity; means for withdrawing said wire from said grinding wheel after the grinding operation; a clamp for clamping said wire in the withdrawn position; a forming die positioned opposite the withdrawn position of said wire; a hook-shaped former; means for moving said former against said wire to bend the latter about said die; means for pivotally swinging said former so as to fold said wire around said die; and means for cutting the bent wire section from said continuous wire at the time of forming the pointed extremity on the incoming wire.

17. A machine for manufacturing fish hooks from a continuous wire comprising: means for intermittently feeding said wire to said machine; a cutting die for forming a pointed extremity on said wire; a gyrating grinding wheel for grinding said pointed extremity; means for withdrawing said wire from said grinding wheel after the grinding operation; a clamp for clamping said wire in the withdrawn position; a forming die positioned opposite the withdrawn position of said wire; a hook-shaped former; means for moving said former against said wire to bend the latter about said die; means for pivotally swinging said former so as to fold said wire around said die; means for cutting the bent wire section from said continuous wire at the time of forming the pointed extremity on the incoming wire; a barbing knife; and means for moving said barbing knife against the side of the incoming extremity while said cutting die is in operation.

PAUL A. NELSON.